UNITED STATES PATENT OFFICE.

FRANCIS J. OAKES, OF NEW YORK, N. Y.

PROCESS OF MAKING PIGMENT AND PRODUCT THEREOF.

1,248,385.  Specification of Letters Patent.  Patented Nov. 27, 1917.

No Drawing.  Application filed December 10, 1913.  Serial No. 805,729.

*To all whom it may concern:*

Be it known that I, FRANCIS J. OAKES, a citizen of the United States, residing at New York, in the county and State of New York, have invented certain new and useful Improvements in Processes of Making Pigments and Products Thereof, of which the following is a specification.

This invention relates to a pigment for use with a suitable vehicle in the printing or coloring of fiber, and of fabrics such as paper, textiles, or other fiber material.

More particularly, it is an object of the invention to provide a coloring agent that, when placed on or in fiber or fabric, will remain stable and not be fugitive under the influences to which the material ordinarily is subjected in use, and yet can be removed or bleached completely by materials that will not injure the fiber or fabric.

The pigment is intended especially for use as a color base, in place of carbon, lamp-black, and the like, in the making of ink for printing on paper; and, when so used, all of the coloring matter thereof can be removed or bleached by the application of solvents of the vehicle and bleaching agents to the color. Thus, paper printed with ink having this pigment as its color base is susceptive of conversion into new paper of practically the colorless condition of new paper-pulp, without injuring the fiber, which is not the case when the color base of the ink contains carbon or a combination of coloring matter and metallic oxids such as iron, manganese, copper, and the like.

The pigment is insoluble in water, it is an impalpable amorphous powder, it may be ground or rubbed up in linseed oil or other vehicles commonly used in the preparation of inks or coating materials, and it dries in the air like other pigments associated with a similar menstruum.

The invention, in the production of a satisfactory pigment of the kind indicated, contemplates the employment of a substance containing the color principle of logwood, when a black pigment is to be made; when another color or shade is to be made, it contemplates the employment of a substance containing the color principle of logwood associated with a color-modifier, such as the color principle of fustic, in a quantity required by the results sought; and, further, it contemplates the employment of any color principle, of properties equivalent or substantially equivalent to those mentioned, that will be acted on in substantially the same manner as that of logwood by the materials employed as described.

In carrying out the invention, to a liquid mass that contains a color lake that includes an oxidized organic color principle there is added an alkaline solution of a resin, the alkalinity of such solution being sufficient to neutralize the acid in the mass. Thereafter, the mass is treated to cause the resin to form a complete union with the color lake, whereby a pigment is formed in the mixture. The pigment is separated from the mixture in any suitable manner.

The following described process exemplifies a preferable manner of treating material having color matter of logwood as its color principle in the production of a black pigment in accordance with the invention, and it typifies the method contemplated by the invention of treating other coloring matter of equivalent or approximately equivalent properties:

An aqueous mixture containing in a color lake a known quantity of oxidized coloring matter of logwood as its color principle, and acid and soluble salts remaining after oxidation of the color matter, is taken and the acidity of the mass is ascertained. Such a mass exists when a chromium salt has been used as the oxidizing agent of the coloring matter in a manner practised in the art.

Now I determine the quantity of caustic soda, carbonate of soda, or other alkali necessary to combine with the acid content of the mass to neutralize it. I take an aqueous solution of that quantity of alkali and dissolve therein a quantity of resin, preferably colophony, this quantity being dependent upon the amount of coloring matter used and being sufficient to combine with the coloring matter. I make a perfectly clear solution of the resin by applying heat. Then I permit the alkaline solution to cool to a temperature of 100 degrees F. When that temperature is reached, I add the alkaline resin solution slowly to the mass containing the color lake, constantly stirring to obtain a complete union with the color lake. I next proceed to raise the temperature of the total mass to boiling and I boil it until such time as there is formed in the mass an insoluble pigment containing the coloring matter. It will be noted that the proportions of materials used are such that the mass at this time is neutral and contains no free acid.

During this treatment of the mass, the alkali neutralizes the acid present, and simultaneously the resenic content of the alkali solution combines with the color lake in a flocculent amorphous mass, and this combination containing coloring matter is precipitated as a homogeneous amorphous pigment, insoluble in water, that has been produced by a perfect chemical and physical combination of the resin and color lake.

The supernatant liquor containing the soluble salts are removed by decantation or filtration, the pigment is dried and thereby freed of moisture, and a product obtained that comprises an organic color matter, a dehydrated oxid, and a resin in homogeneous union.

By adding the resin as described and conducting the subsequent steps of the process, a dried pigment is produced that is miscible with such resins and oils and solvents as usually are employed in the combinations in which carbon or lamp-black is used as a color base.

When morin, which is the color principle of fustic, or other matter of equivalent or substantially equivalent properties to the color principle of logwood, is used with a logwood solution to modify the color or shade of the pigment to be produced, and when another color principle of properties equivalent or substantially equivalent to the color principle of logwood is employed alone or with other similar coloring matters, that have been converted to an oxidized condition, the treatment is substantially similar to that described for the logwood only.

Having thus described my invention, what I claim as new, and desire to secure by Letters Patent, is—

1. The process of making pigment that comprises the mixing, with a liquid mass containing a color lake including an oxidized color principle and containing an acid, of an alkaline solution of a resin, whereby a complete union of resinic matter and color lake is effected.

2. The process of making pigment that comprises the mixing, with a liquid mass containing a color lake including a known quantity of oxidized color principle and containing an acid, of an alkaline solution of a sufficient quantity of resin to combine with said color principle, whereby a complete union of resinic matter and color lake is effected.

3. The process of making pigment that comprises the mixing, with a liquid mass containing a color lake including an oxidized color principle and containing a known quantity of acid, of an alkaline solution of a resin of sufficient alkalinity to neutralize the acid, whereby a complete union of resinic matter and color lake is effected and a neutral pigment produced.

4. The process of making pigment that comprises the mixing, with a liquid mass containing a color lake including a known quantity of oxidized color principle and containing a known quantity of acid, of an alkaline solution of a sufficient quantity of resin to combine with said color principle and of sufficient alkalinity to neutralize the acid, whereby a complete union of resinic matter and color lake is effected and a neutral pigment produced.

5. The process of making pigment that comprises the mixing, with a liquid mass containing a color lake including an oxidized color principle and containing an acid, of an alkaline solution of a resin, and boiling the mass until there is formed therein an insoluble pigment containing the oxidized color principle and resinic matter.

6. The process of making pigment that comprises the mixing, with a liquid mass containing a color lake including an oxidized color principle and containing an acid, of an alkaline solution of a resin, boiling the mass until there is formed therein an insoluble pigment containing the oxidized color principle and resinic matter, and separating the pigment from the mass.

7. The process of making pigment that comprises the mixing, with a liquid mass containing a color lake including an oxidized color principle and containing an acid, of an alkaline solution of a resin, boiling the mass until there is formed therein an insoluble pigment containing the oxidized color principle and resinic matter, separating the pigment from the mass, and expelling moisture from the pigment.

8. The process of making pigment that comprises the mixing of an alkaline solution of a resin with a liquid mass containing acid and a color lake including oxidized logwood color principle, whereby a complete union of resinic matter and color lake is effected.

9. The process of making pigment that comprises the mixing of an alkaline solution of a resin with a liquid mass containing acid and a color lake including oxidized logwood color principle and a color-modifier, whereby a complete union of resinic matter and color lake is effected.

10. A pigment comprising the combination of organic coloring matter, an oxidizing oxid, and resinic matter.

11. A pigment comprising the combination of coloring matter of logwood, an oxidizing oxid, and resinic matter.

12. A homogeneous amorphous pigment containing the combination of an organic coloring matter, an oxidizing oxid, and resinic matter.

13. A pigment comprising the combination of resinic matter and oxidized coloring matter of logwood.

14. A pigment comprising the combination of coloring matter of logwood and a color-modifier in an oxidized state, and resinic matter.

15. A homogeneous amorphous pigment containing the combination of oxidized coloring matter of logwood and resinic matter.

16. A homogeneous amorphous neutral pigment containing the combination of coloring matter of logwood, an oxidizing oxid, and resinic matter.

In testimony whereof I affix my signature in presence of two witnesses.

FRANCIS J. OAKES.

Witnesses:
 CLINTON L. SMALL,
 FRANK DEVLIN.